United States Patent
Bayless et al.

(10) Patent No.: US 11,206,175 B1
(45) Date of Patent: Dec. 21, 2021

(54) PATH ANALYSIS SERVICE FOR IDENTIFYING NETWORK CONFIGURATION SETTINGS THAT BLOCK PATHS IN VIRTUAL PRIVATE CLOUDS (VPCS)

(71) Applicant: Amazon Technologies, Inc., Seattle, WA (US)

(72) Inventors: Samuel Bayless, Vancouver (CA); John David Backes, Minneapolis, MN (US); Daniel William Dacosta, Saint Paul, MN (US); Benjamin F Jones, Portland, OR (US); Patrick Trentin, Borgo Valsugana (IT); Nathan Launchbury, Portland, OR (US); Sagar Chintamani Joshi, Redmond, WA (US); Nandita Mathews, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/117,930

(22) Filed: Dec. 10, 2020

(51) Int. Cl.
*G06F 15/177* (2006.01)
*H04L 12/24* (2006.01)
*H04L 12/26* (2006.01)

(52) U.S. Cl.
CPC ...... *H04L 41/0672* (2013.01); *H04L 41/0816* (2013.01); *H04L 41/0886* (2013.01); *H04L 41/12* (2013.01); *H04L 41/22* (2013.01); *H04L 43/0817* (2013.01); *H04L 43/0852* (2013.01)

(58) Field of Classification Search
CPC . H04L 41/0672; H04L 43/0817; H04L 41/22; H04L 43/0852; H04L 41/0886; H04L 41/12; H04L 41/0816
See application file for complete search history.

(56) References Cited

U.S. PATENT DOCUMENTS

| 2014/0215058 | A1* | 7/2014 | Vicat-Blanc | H04L 43/045 709/224 |
| 2020/0382540 | A1* | 12/2020 | Iekel-Johnson | H04L 63/20 |

\* cited by examiner

*Primary Examiner* — Padma Mundur
(74) *Attorney, Agent, or Firm* — Lee & Hayes, P.C.

(57) ABSTRACT

This disclosure describes techniques for identifying blocked paths and network configuration settings that block paths in networks, such as network paths in a virtual private cloud (VPC). The configuration of virtual networks depends on the correct configuration of many networking resources, such as firewalls, security groups, routing lists, access control lists (ACLs), and the like. In some cases, an analysis that uses formal methods can be performed to determine a network configuration of a virtual network. Using the network configuration information, network paths that are blocked and network configuration settings that may be blocking one or more of the network paths can be determined. The PAS can provide an explanation of what is blocking the network paths. For example, the PAS may identify that a configuration setting of a firewall, router, network gateway, an access control list (ACL), and the like may be blocking a network path.

20 Claims, 10 Drawing Sheets

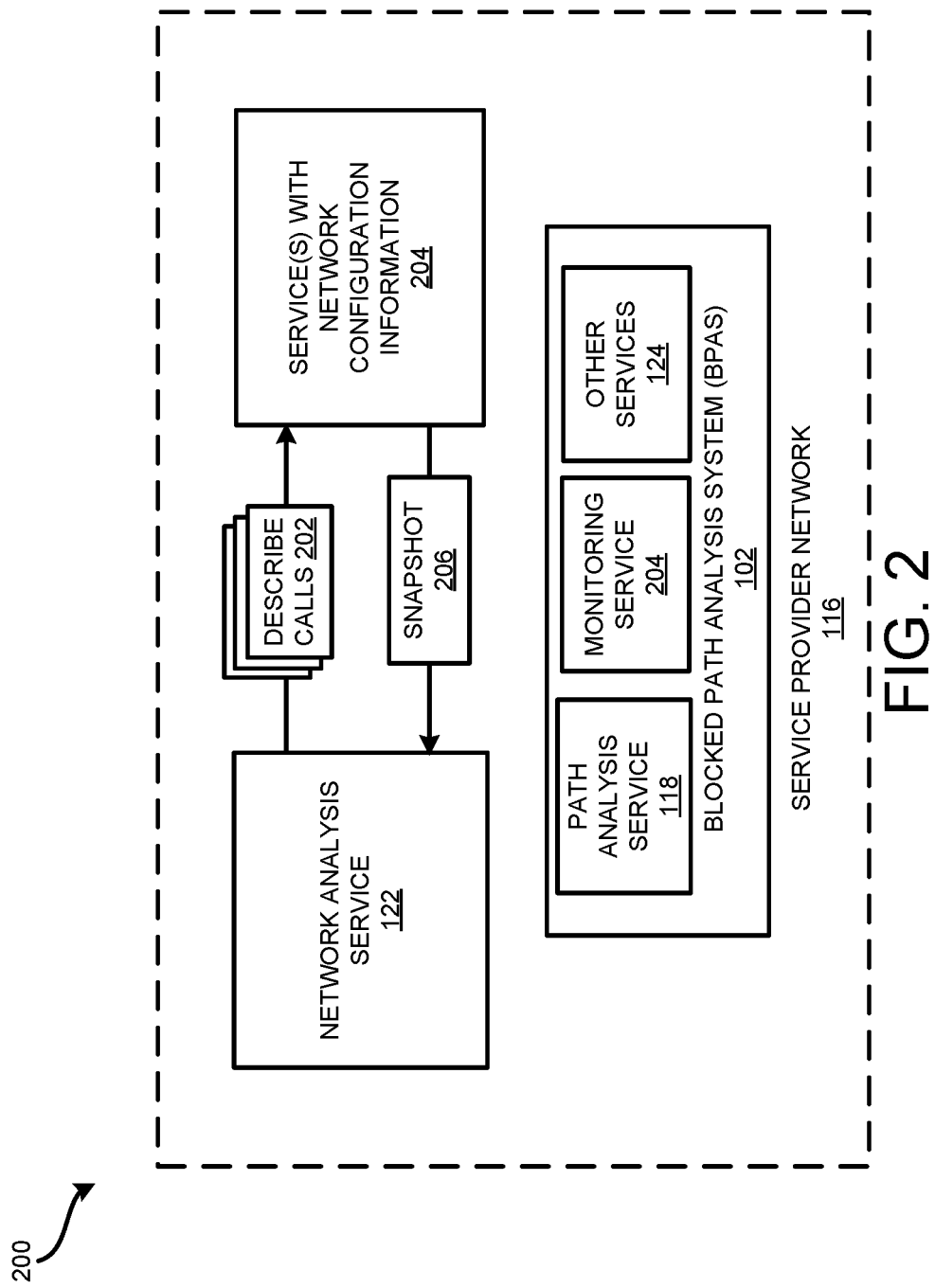

PATH ANALYSIS SERVICE FOR IDENTIFYING NETWORK CONFIGURATION SETTINGS THAT BLOCK PATHS IN VIRTUAL PRIVATE CLOUDS (VPCS)

BACKGROUND

Service providers offer cloud-based services to fulfill users' computing-service needs without the users having to invest in and maintain computing infrastructure required to implement the services. These service providers may maintain networks of managed computing resources and functionality to implement various types of on-demand services, such as storage services, compute-power services, database-management services, networking services, and so forth.

A customer of a service provider can set up one or more virtual private clouds (VPCs). These VPCs may be configured with public and private subnets, as well as Internet gateways (IGWs). In public subnets, Web Application Proxy servers (or "proxies") can be implemented using Internet-accessible virtual machine (VM) instances to provide external users with secure inbound connectivity to the customer's web applications without requiring virtual private network (VPN) connectivity. If the customer is an organization, for example, this allows users outside of the organization to access the organization's internal web applications over the Internet. In some cases, however, a customer may not properly configure the VPCs. In these cases, one or more of the network paths through one or more of the VPCs may be blocked thereby causing a failed connection between some of the network resources.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 2 is a software and network architecture diagram showing aspects of a path analysis service (PAS) that identifies blocked network paths and data indicating possible network configuration settings that are blocking one or more of the paths.

DETAILED DESCRIPTION

Figure 1:
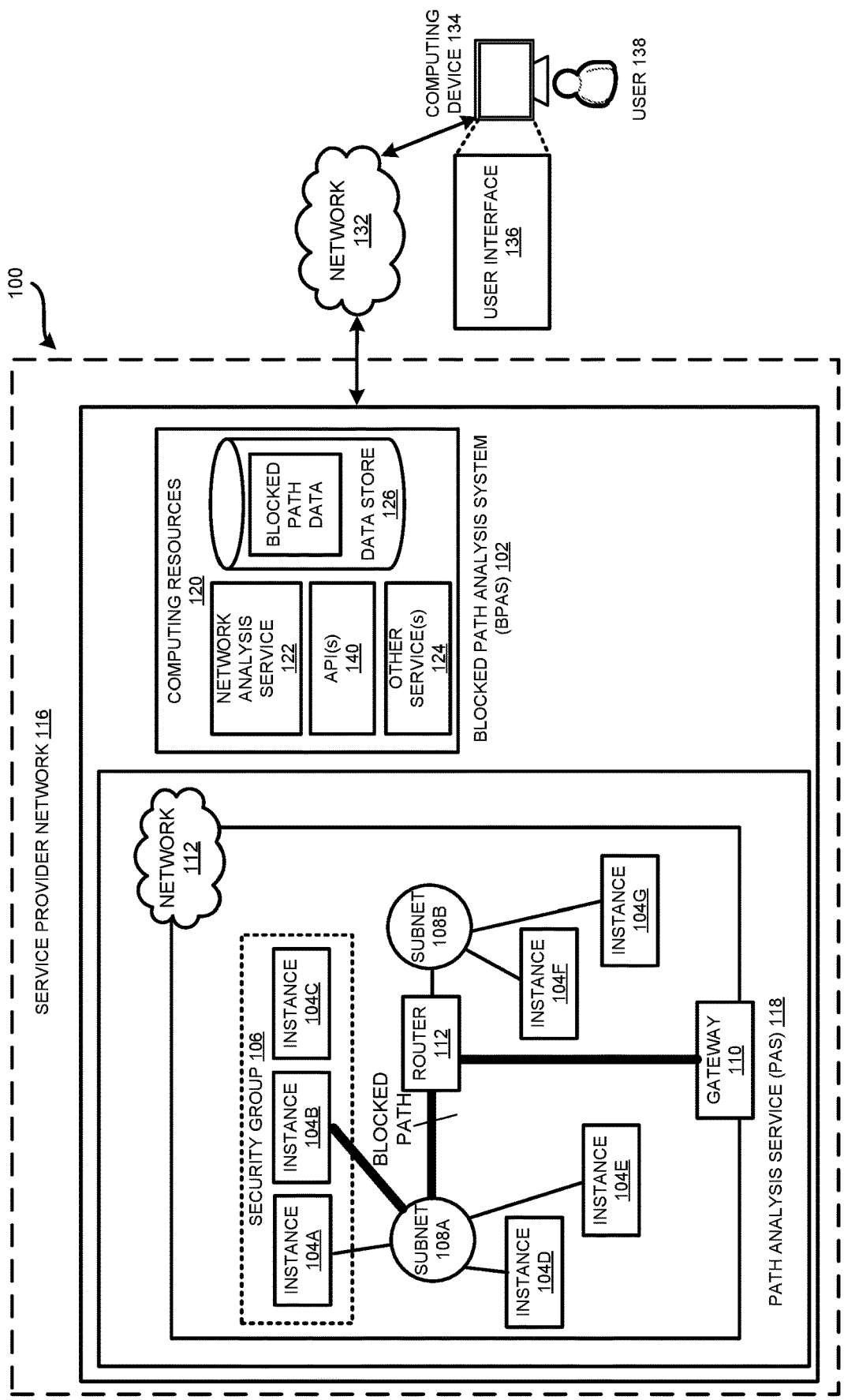
FIG. 1 is a software and network architecture diagram showing aspects of identifying network paths that are blocked in a network hosted by a service provider network and generating one or more reasons as to why the network paths are blocked.

This disclosure relates to techniques for identifying blocked network paths and network configuration settings that block the network paths, such as network paths in a virtual private cloud (VPC). A VPC is a custom-defined, virtual network within another network, such as a cloud provider network. A VPC can provide the foundational network layer for a cloud service, for example a compute cloud or an edge cloud, or for a customer application or workload that runs on the cloud. A VPC can be defined by at least its address space, internal structure (e.g., the computing resources that comprise the VPC), and transit paths. Techniques described herein may apply to networks that utilize one or more service/cloud provider networks (sometimes referred to simply as a "cloud") and may include networks that are external to the service provider network (e.g., at client-owned premises or client-managed data centers) and/or networks that include computing resources allocated within a service provider network on behalf of a user (e.g., a VPC).

Creating functional networks depends on the correct configuration of many networking resources, structures, and functionalities (referred to herein as "networking elements"). As discussed in more detail below, a user of a service provider network may create, configure, populate, and modify networks including networking elements using services, APIs, and/or other functionality provided by the service provider network. Many networking elements include network configuration settings that may restrict and/or redirect the flow of packets. For example, networking elements may include load balancers, firewalls, security groups, routing lists, access control lists (ACLs), gateways, network interfaces, subnets, instances, and the like that are configured to block/allow traffic to flow from/to particular networking elements.

Using techniques described herein, a user of a service provider network may utilize a path analysis service (PAS) to identify infeasible network paths (which may be referred to herein as "blocked network paths" or "blocked paths") when there is no path that a packet can take between two endpoints. The PAS can further identify network configuration settings that may be causing the blocked network path, and data indicating why the network path is blocked. As used herein, the term "blocked network path" refers to a network path that includes one or more networking elements and/or one or more network configuration settings that prevents/blocks the flow of packets from a source endpoint to a destination endpoint within a network. In some examples, the source endpoint and the destination endpoint may be located within the same network. In other examples, the source endpoint may be in one network and the destination endpoint may be located within another network.

The PAS may identify one or more blocked network paths between the source endpoint and the destination endpoint and provide an explanation of what is blocking the network path. Identifying a blocked network path may include examining one or more possible network paths over a network that includes networking elements between a source and a destination. The network path may be a direct path over the network that could provide network connectivity between endpoints, or alternatively may be a transitive path that passes through one or more hops on a route and that provides network connectivity between the different endpoints.

In some configurations, the PAS displays complete network paths that include networking elements before/after a blockage between the source endpoint and the destination endpoint. The PAS may also provide an indication of network configuration settings for networking elements along the path that may be causing the path to be blocked. For instance, the PAS may show that a firewall setting is blocking the path at one point in the blocked path, and that a router setting is blocking the path at another point in the blocked path. As another example, the PAS may identify that network configuration settings of a firewall, router, network gateway, an access control list (ACL), or some other networking element is blocking the path.

According to some examples, the PAS uses a network analysis service to formally/statically analyze network connectivity. In some configurations, the network analysis service may also provide other network information such as information that identifies networking elements within the network (e.g., instances that are included within the network), include descriptions of the networking elements (e.g., roles assigned to computation instances, permissions granted to or denied to resource instances, IP addresses assigned to the instances, etc.), describe relationships among the networking elements (e.g., paths over the network between instances), and describe interfaces or access points to external entities (e.g., computation instances that can be accessed by entities external to the virtual network).

In some cases, the network analysis service performs a static network analysis before tasks are run across the network. For instance, in some examples, the network analysis service may use formal methods, or some other verification technique, to determine paths within a network to be deployed within the service provider network. "Formal methods" refers to design techniques that use rigorously specified mathematical models to build software and hardware systems. Formal methods may utilize mathematical proof alone or as a complement to dynamic testing in order to help ensure correct behavior of network resources that are included within the network. The PAS may then use this network information to identify the networking elements that are blocking the flow of packets within the network and creating a blocked path.

The PAS may provide significant advantages when compared to conventional network analysis methods such as port scanning and syntactic check methods. Unlike these conventional methods, using the network information generated by the network analysis service, the path analysis service has knowledge of the networking elements and resource instances as well as their complex interrelationships. Unlike conventional methods that rely on devices being operational at the time of a network scan, and that thus may only identify paths over the network between devices that exist at the time of the scan, the descriptive information may be used to identify paths over the network devices defined by the network description. Therefore, paths over the network can be identified even if respective devices or instances are not operational and listening. Further, various scanning methods may identify network paths, but not blocked paths within a virtual network. Configurations of the path analysis service on the other hand, may find blocked paths within the network as well as identifying network configuration settings that may be incorrectly configured. Further, unlike conventional methods such as port scanning methods that require substantial network and CPU bandwidth, examples described herein have little or no impact on a client's virtual network, and network access to every device on the service provider network is not required as is the case with port scanning methods.

According to some configurations, the network analysis service, PAS and other services may expose different input mechanisms, such as a graphical user interface (GUI), a user interface (UI), a command line interface (CLI), an application programming interface (API), and the like. In some examples, the PAS may generate a graphical representation of a network hosted by the service provider network and created by a user of the service provider network. The graphical representation may include a depiction of one or more blocked paths, networking elements along the one or more blocked paths, data indicating why a particular path is blocked, and the like. Generally, the blocked paths may include nodes that represent networking elements and different aspects of the network, such as computing resources, networking resources, and other indicators that show connections between different the resources, as well as data that may indicate information about network configuration settings of the network (e.g., firewall rules, router settings, ACL settings, port access, . . . ).

According to some configurations, the PAS may associate metadata with one or more of the networking elements of the network. As an example, the PAS may annotate the visualization of the network to indicate network settings that are blocking a network path within the virtual network. The annotations may be associated with nodes of the graph and/or edges of the graph that connect the nodes. The PAS may also generate subgraphs for portions of the network, such that cloud, or stand-alone local networks can be analyzed independently. For instance, the user may request that blocked network paths be identified within a particular VPC. After identifying the blocked path(s) within the network, a user may utilize the GUI to view the blocked paths, view explanations as to what network configuration settings may be a cause of one or more blocked paths, and in some examples access the network configuration settings.

As briefly discussed, the PAS may expose an API for the identification of blocked paths and the configuration and management of various parameters, such as network configuration settings, of a network. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The user may utilize the API and/or some other input mechanism to identify blocked paths within a network. After identifying a blocked path, the user may proactively use the API to configure settings to unblock the blocked paths. In some examples, the user might also utilize the GUI, API, or CLI exposed by the PAS to identify the blocked paths and the network configuration settings that may be causing the blocked paths, and the like.

As briefly discussed above, in some configurations, network information for a network hosted at least in part by a service provider network may be obtained even if respective devices or instances are not up and listening. Instead, calls such as describe calls, may be made to APIs of one or more service provider network services that maintain metadata describing virtual networks to obtain information about instances within the service provider network. Using the describe calls paths and other information about the network elements may be identified even if respective devices or instances are not up and listening. In some examples, the network information for the virtual network may include permissions granted or denied to resources (e.g., a permission granting or denying one resource access to an endpoint on the virtual network, permissions specifying IP address ranges or particular ports of resource instances that can or cannot access a given endpoint (e.g., a storage endpoint), etc.). In these examples, identifying a blocked path may include examining different configuration settings of the different resource instances within the possible path.

An endpoint (also referred to as a network endpoint or a service endpoint) represents an entry point for an application, network, or service such as a cloud service, third-party service running on cloud infrastructure (e.g., a customer's software application), or service running on infrastructure external to the cloud provider network (e.g., on-premise of a customer). A service endpoint can be the uniform resource locator (URL) of the service. Service endpoints enable programmatic connection to the service. As an example, services may offer a regional endpoint that can be used to make requests, which in some embodiments may follow the general syntax of protocol://service-code.region-code.examplecloud.com. A VPC endpoint can enable customers to privately connect their VPCs to supported cloud services without requiring an internet gateway, NAT device, VPN connection, or direct connection, such that traffic between that VPC and the service does not leave the private network backbone of the cloud provider network. A VPC endpoint may be considered as a service endpoint if it is used to access the application running in that VPC. Such endpoints can have a private IP address from the IP address range of the VPC or subnet.

While the techniques described herein are with reference to networks such as VPCs, the techniques are equally applicable to other networks. Additionally, while the examples herein discuss utilization of networks provided by a service provider, implementations are not so limited. For example, the techniques provided herein may be operating in other networks, across networks provide by different service providers, across a cloud network and a customer's on-premise network, and the like.

Certain implementations and examples of the disclosure will now be described more fully below with reference to the accompanying figures, in which various aspects are shown. However, the various aspects may be implemented in many different forms and should not be construed as limited to the implementations set forth herein. The drawings herein are not drawn to scale. Like numerals represent like elements throughout the several figures (which might be referred to herein as a "FIG." or "FIGS.").

FIG. 1 is a software and network architecture diagram 100 showing aspects of identifying network paths that are blocked in a network hosted by a service provider network 116 and generating one or more reasons as to why the network paths are blocked. It is to be appreciated that the environment 100 is merely illustrative and that the various configurations disclosed herein can be utilized in many different types of computing environments.

To provide functionality disclosed herein, the blocked path analysis system (BPAS) 102 may include one or more computing resources 120. The computing resources 120 may be provided by a service provider that operates one or more service/cloud provider networks 104 (sometimes referred to simply as a "cloud"), which refers to a large pool of network-accessible computing resources (such as compute, storage, such as data store 126, and networking resources, applications, and services), which may be virtualized or bare-metal. The cloud can provide convenient, on-demand network access to a shared pool of configurable computing resources that can be programmatically provisioned and released in response to user commands. These resources can be dynamically provisioned and reconfigured to adjust to variable load. Cloud computing can thus be considered as both the applications delivered as services over a publicly accessible network (e.g., the Internet, a cellular communication network, etc.) and the hardware and software in cloud provider data centers that provide those services.

The cloud provider network can provide on-demand, scalable computing platforms to users through a network, for example allowing users to have at their disposal scalable "virtual computing devices" via their use of the compute servers and block store servers. These virtual computing devices have attributes of a personal computing device including hardware (various types of processors, local memory, random access memory ("RAM"), hard-disk and/or solid-state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their users or clients. The computing resources 120 implemented by the BPAS 102 and executed on behalf of one or more users of the service provider can be data processing resources, such as virtual machine ("VM") instances, data storage resources, networking resources, data communication resources, network services, and other types of resources.

The computing resources 120 utilized can be general-purpose or can be available in a number of specific configurations. For example, data processing resources can be available as physical computers or VM instances in a number of different configurations. The VM instances can be configured to execute applications, including web servers, servers, media servers, database servers, some or all of the network services described above, and/or other types of programs. Data storage resources can include file storage devices, block storage devices, and the like. The BPAS 102 can also include and utilize other types of computing resources not mentioned specifically herein.

According to some configurations, servers are utilized to provide at least a portion of the computing resources 120 and execute software components to provide functionality described herein, including functionality related to the configuration and management of global private networks. The software components can execute on a single server or in parallel across multiple servers in the BPAS 102. In addition, a software component can consist of subcomponents executing on different servers or other computing devices in the BPAS 102. Various components can be implemented as software, hardware, or any combination of the two. In this regard, it is to be appreciated that the BPAS 102 shown in FIG. 1 has been simplified for discussion purposes and that many additional software and hardware components can be utilized.

A user 138 of the BPAS 102 can utilize a computing device 134, or some other input device, to access the BPAS 102 through a network 132. The user 138 may be a user of the service provider network 116 that provides computing resources within the service provider network 116. The computing device 134 is an input/output device configured to receive input associated with specifying parameters utilized by the network analysis service 122, the path analysis service (PAS) 118, and/or other services 124 to view blocked path information, configure and manage networks, such as network 112 that is hosted by the service provider network 116. The computing device 134 may also present for display a user interface 136, that may be utilized by the user 138 to view a graphical representation of a network, such as network 112, interact with the graphical representation to set or view blocked paths, network configuration settings associated with the network, and the like. The user interface 136 may also be utilized by the user as a CLI to interact with the network.

The computing device 134 may be one or more devices, such as but not limited to a smart phone, a smart watch, a personal computer ("PC"), desktop workstation, laptop computer, tablet computer, notebook computer, personal digital assistants ("PDA"), electronic-book reader, game console, set-top box, consumer electronics device, server computer, or any other type of computing device capable of connecting to the network 132 and communicating with the BPAS 102.

As illustrated, the computing device 134 may couple with the BPAS 102 over a network 132. The network 132 may represent an array or wired networks, wireless networks (e.g., WiFi), or combinations thereof. The BPAS 102 may provide a variety of different services (not shown) as a network-accessible platform that is implemented as a computing infrastructure of processors, storage, software, data access, and so forth that is maintained and accessible via the network 132, such as the Internet. These services may not require end-user knowledge of the physical location and configuration of the system that delivers the services. Common expressions associated with these remote services, include "on-demand computing", "software as a service (SaaS)", "platform computing", "network accessible platform", and so forth.

The network 132 can be a local-area network ("LAN"), a wide-area network ("WAN"), the Internet, or any other networking topology known in the art that connects the user devices to the BPAS 102. The user 138 can use an application (not shown) executing on computing device 134 to access and utilize the functionality provided by BPAS 102. In some examples, the application is a web browser application, such as the Amazon@ Silk@ web browser, or some other web browser. Generally, a web browser application exchanges data with the computing devices in the BPAS 102 using the hypertext transfer protocol ("HTTP") over the network 132.

The application might also be a stand-alone client application configured for communicating with the BPAS 102. The client application can also utilize any number of communication methods known in the art to communicate with the BPAS 102 across the network 132, including remote procedure calls, SOAP-based web services, remote file access, proprietary client-server architectures, and the like. According to some configurations, the application provides a user interface 136 that can be utilized by the user 138 for the configuration and management of one or more global private networks. The user interface 136 may also be utilized to present data, and/or to interact with the BPAS 102.

As briefly discussed above, a user of a service provider network 116, and/or a component or device, may utilize the BPAS 102 to identify blocked network paths, such as the blocked path illustrated by the bold line in network 112, receive data indicating a reason of the blocked paths, and in some examples configure one or more network configuration settings to fix the blocked path. In the example illustrated in FIG. 1, the user 138 is analyzing the network 112.

Network 112 illustrates an example virtual network that may be hosted by the service provider network 116 and analyzed by the BPAS 102. As illustrated, network 112 includes subnets and security. In some examples, the user 138, or some other user, may establish and manage virtual security groups, such as security group 106, within the virtual network 112, within or across subnets, such as subnet 108A and subnet 108B. A security group 106 is a logical grouping of resource instances 104 and acts as a virtual firewall that controls the traffic allowed to reach one or more resource instances 104A-104C within the security group 106 according to security group rules. While one security group 106 is illustrated, the user 138 may establish other security groups 106 within the virtual network 112 (not shown) and may associate resource instance 104 in the virtual network 112 with one or more of the security groups 106. In some configurations, the user 138 may establish and/or modify rules for each security group 106 that control the inbound traffic allowed to reach the resource instances 104 associated with the security group 106.

In the example of FIG. 1, the network 112 is subdivided into two subnets 108A and 108B. Access to the virtual network 112 is controlled by gateway(s) 110. Each subnet 108 may include at least one router 112 that acts to route traffic to (and from) resource instances 104 on the respective subnet 108. In some configurations, network access control lists (ACLs) may be used to control access to the subnets 108 at router(s) 112. In the example shown in FIG. 1, resource instances 104D and 104E are on subnet 108A, and resource instances 104F through 104G are on subnet 108B. The user 138 has established one security group 106. A security group, however, may extend across subnets 108. In addition, a resource instance 104 may be included in two or more security groups 106.

According to some examples, the BPAS 102 uses functionality provided by the PAS 118 for identifying blocked paths, identifying network configuration settings that block the paths, such as network paths in a virtual private cloud (VPC). As briefly discussed above, the PAS 118 may identify one or more blocked network paths between a source endpoint (e.g., gateway 110) and a destination endpoint (e.g., security group 106) and provide an explanation of what is blocking the network path. In some examples, the PAS 118 identifies one or more possible network paths over the network. In the current example, the PAS 118 has identified a blocked path (as indicated by the thick line in network 112).

Figure 3A:
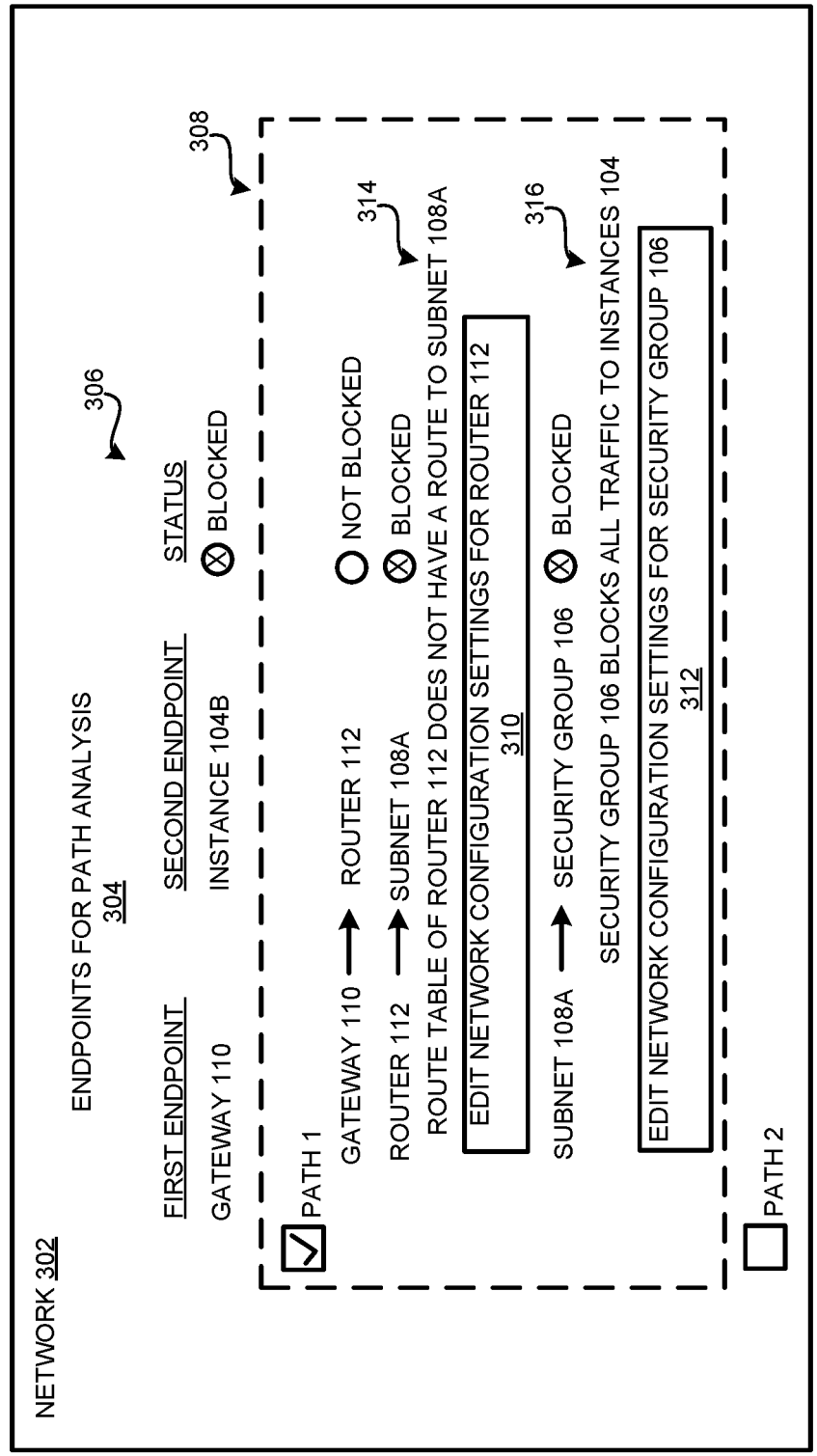
FIG. 3A is a diagram showing an exemplary graphical user interface for viewing and interacting with information about blocked network paths within a network.
Figure 3B:
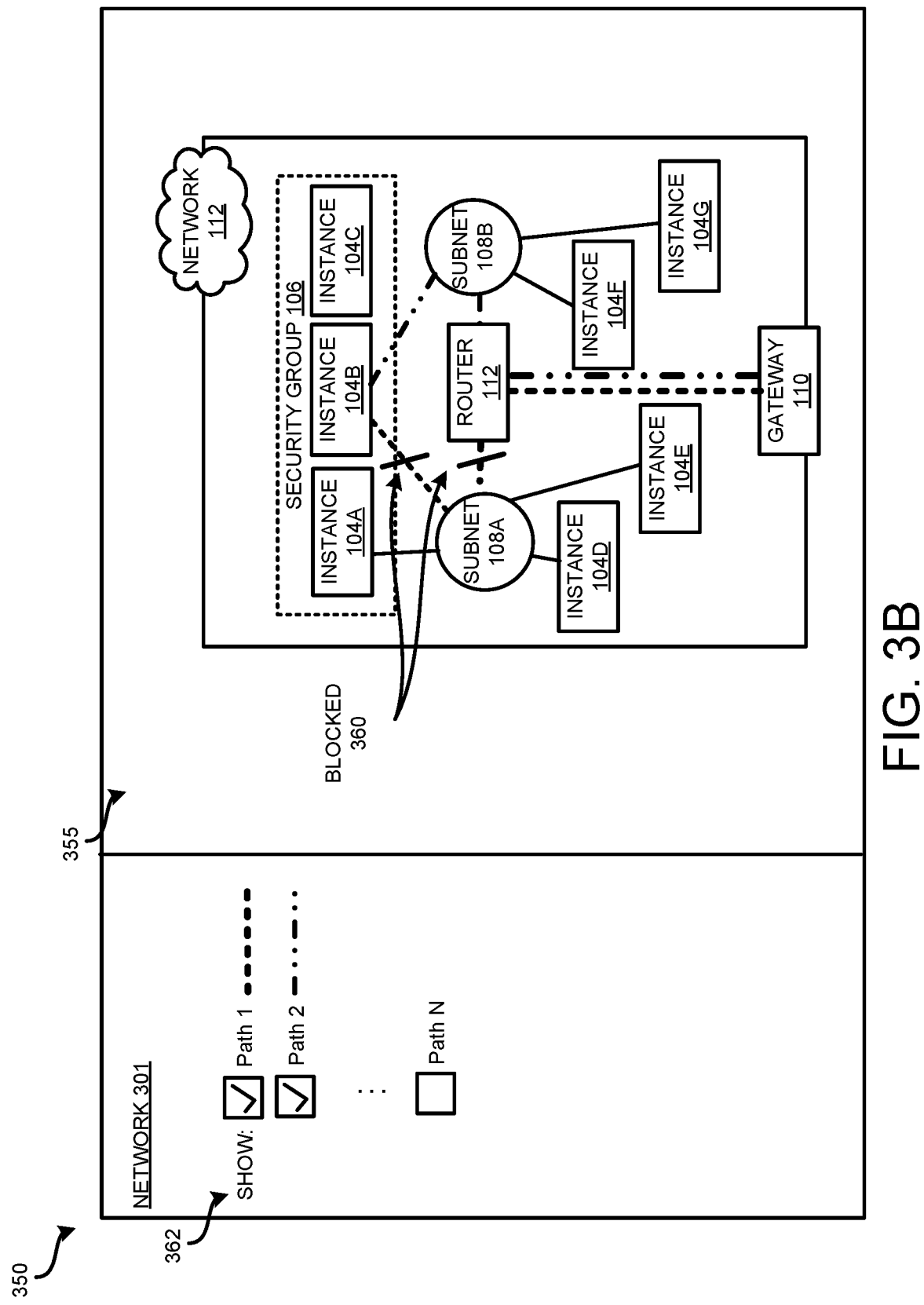
FIG. 3B is a diagram showing an exemplary graphical user interface for viewing a graphical representation of blocked paths and interacting with information about blocked network paths within a network.

In some configurations, the PAS 118 displays network paths that include all of the networking elements before/after a blockage between the source endpoint and the destination endpoint (See FIG. 3 for more details). The PAS 118 may also provide an indication of the blocked path as well as provide an indication of network configuration settings for networking elements along the path that may be causing the path to be blocked. For instance, the PAS 118 may show that a router setting of router 112 is blocking the path (See FIGS. 3A and 3B). A network path may be blocked in many different ways. For example, network configuration settings of a routing table may misdirect packets. Instead of the routing table directing packets toward a networking element, the routing table may incorrectly route packets to a different networking element. Network configuration settings associated with a security group/access control list/firewall and/or other network elements that are incorrectly specified may block packets that should reach a networking element from reaching the networking element, a network port may not be open, and the like.

According to some configurations, the PAS 118 obtains network information for a network from a network analysis service 122. The network information may, for example, identify networking elements within the network (e.g., instances that are included within the network), include descriptions of the networking elements (e.g., roles assigned to computation instances, permissions granted to or denied to resource instances, IP addresses assigned to the instances, etc.), describe relationships among the networking elements (e.g., paths over the network between instances), and describe interfaces or access points to external entities (e.g., computation instances that can be accessed by entities external to the virtual network). In some configurations, network information for a network hosted at least in part by a service provider network 116 may be obtained even if respective devices or instances are not up and listening. Instead, DESCRIBE calls may be made to APIs of one or more service provider network services that maintain metadata describing virtual networks, and thus paths may be identified even if respective devices or instances are not up and listening. In some examples, the network information for the virtual network may include permissions granted or denied to resources (e.g., a permission granting or denying one resource access to an endpoint on the virtual network, permissions specifying IP address ranges or particular ports of resource instances that can or cannot access a given endpoint (e.g., a storage endpoint), etc.). In these examples, identifying a blocked path may include examining different configuration settings of the different resource instances within the possible path.

According to some configurations, the network analysis service 122, PAS 118 and other services 124 may expose different input mechanisms, such as a graphical user interface (GUI), a user interface (UI), a command line interface (CLI), an application programming interface (API), and the like. In some examples, the PAS may generate a graphical representation of a network hosted by the service provider network and created by a user of the service provider network. The graphical representation may include a depiction of one or more blocked paths, networking elements along the one or more blocked paths, data indicating why a particular path is blocked, and the like. Generally, the blocked paths may include nodes that represent networking elements and different aspects of the network, such as computing resources, networking resources, and other indicators that show connections between different the resources, as well as data that may indicate information about network configuration settings of the network (e.g., firewall rules, router settings, ACL settings, port access, . . . ). In some examples, the user may access network configuration settings associated with one or more of the networking elements in order to provide changes/updates to one or more values. For instance, if the graphical representation indicates a problem with a gateway, the user may use a UI element to access the network configuration settings for the networking element blocking the path and specify the network configuration settings to unblock the path.

According to some configurations, the PAS 118 may associate metadata with one or more of the networking elements of the network. As an example, the PAS 118 may annotate the visualization of the network to indicate network settings that are blocking a network path within the virtual network. The annotations may be associated with nodes of the graph and/or edges of the graph that connect the nodes. The PAS may also generate subgraphs for portions of the network, such that cloud, or stand-alone local networks can be analyzed independently. For instance, the user may request that blocked network paths be identified within a particular VPC. After identifying the blocked path(s) within the network, a user may utilize the GUI to view the blocked paths, view explanations as to what network configuration settings may be a cause of one or more blocked paths, and in some examples access the network configuration settings.

As an example, after creating a network, a user may use the PAS to identify a blocked path within the network. Instead of a user having to manually examine every networking element to see where a network configuration setting is incorrectly set, the PAS may indicate the networking elements within the path that may be causing the blocked path. In some examples, there may be more than one network configuration setting and more than one networking element within the path that is incorrectly configured.

Additional details regarding the various components and processes described briefly above for configuring and managing global private networks will be provided below with regard to FIGS. 2-9.

FIG. 2 is a software and network architecture diagram showing aspects of a blocked path analysis service (PAS) that identifies blocked network paths and data indicating possible network configuration settings that are blocking one or more of the paths.

As briefly discussed above, the network analysis service 122, the PAS 118, and/or some other device or component of the BPAS 102 may perform static and/or dynamic analysis to determine blocked paths of a network. Managing network reachability can be difficult in large, complex networks that span across both stand-alone networks and the cloud, as the reachability depends on the correct configuration of many resources and networking devices. Further, the network may include firewalls, security groups, access control lists (ACLs)/network access control lists (NACLs) that are configured to block/allow traffic to flow between different network endpoints. According to some configurations, the monitoring service 204 of the BPAS 102 is configured to manage the monitoring of the different networks, live connectivity between networks, and identify problems in network reachability between different network endpoints when the network is operating within the service provider network 116. In some configurations, the monitoring service 204 is configured to obtain metrics data and/or event data from the networks 118. Generally, metrics data includes metrics that identify a performance of a computing resource and/or a network element.

In the example illustrated in FIG. 2, the network analysis service 122 identifies networking elements allocated to the user 138. The network analysis service 122 may make one or more describe calls 202, such as instance 118 describe calls, VPC 120 describe calls, security group describe calls, load balancer describe calls, and the like. These describe calls 202 can be made to one or more services 202 of the service provider network 116 that have network configuration information about customer accounts of users 138 of the service provider network. Based on the describe calls 202, a snapshot 206 of the network configuration for a customer account may be returned to the network analysis service 122. This snapshot 206 may include a point-in-time network configuration for the user account, as well as a complete set of the instances allocated to the user 138. As discussed above, the network information associated with the snapshot may identify instances of the networking primitives that are implemented in the virtual network, include descriptions of the instances (e.g., roles assigned to computation instances, permissions granted to or denied to resource instances, IP addresses assigned to the instances, etc.), describe relationships among the instances (e.g., paths over the network between instances), and describe interfaces or access points to external entities (e.g., computation instances that can be accessed by entities external to the virtual network).

Using this snapshot 206, the network analysis service 122 may use logic (e.g., mathematical models, rules, criteria, etc.) to generate the network information that is used by the PAS 118 to determine the blocked paths and the reasons for the blocked paths.

FIGS. 3A-3B are diagrams showing exemplary graphical user interfaces for viewing and interacting with information about blocked network paths within a network. In some examples, the user uses a graphical user interface (GUI). In other examples, the user may use a command line interface, or utilize an Application Programming Interface (API). FIGS. 3A, and 3B illustrate example graphical user interfaces 300, and 350 where the user 138 can view data about blocked paths in networks. In some instances, the BPAS 102 may provide data for displaying a GUI to a display associated with the user computing device 138.

In the example illustrated in FIG. 3A, GUI 300 shows user interface (UI) elements for viewing information about blocked paths and interacting with network configuration settings that may be adjusted by the user 138. More or fewer UI elements may be included within GUI 300. As illustrated, the GUI 300 includes one or more UI elements 306 to enter endpoints for the identification of any blocked paths, and a blocked path information display area 308 that indicates information about a particular path/blocked path within the network 302.

In the current example, the PAS 112 has identified two blocked paths (See FIG. 3B for an illustration of the two blocked paths). In FIG. 3A, the user 138 has selected to view information about blocked path 1 of network 302. As illustrated, display area 308 shows the hops between each of the networking elements in the blocked path 1. The first hop between gateway 110 and router 112 is not blocked. The next hop between router 112 and subnet 108A is blocked. As discussed above, for some examples, when a particular networking element is blocked, the PAS 118 may display a reason for the block (indicator 314) and may provide an edit network configuration setting UI element 310 that, when selected, is used to edit a network configuration setting for the router 112. The next hop between subnet 108A and security group 106 is also blocked. In this case, the PAS 118 may display a reason for the block (indicator 316) and may provide an edit network configuration setting UI element 312 that, when selected, is used to edit a network configuration setting for the security group 106. Editing the network configuration setting for the security group 106 may remove the block of the packet flow at the security group 106.

FIG. 3B shows GUI 350 that includes user interface (UI) elements for viewing a graph representing the network including two blocked paths, connections between networking elements, and indications of the blocked connectivity 360 of the paths. More or fewer UI elements may be included within GUI 350. As illustrated, the GUI 350 includes a network display area 301 that includes show path UI elements 362 selectable to view different paths within the network 112. In the current example, the user 138 has selected to view a first path and a second path.

The GUI 350 also includes a graph display area 355 that, in this example, displays a graphical representation of the network 112 and the two selected paths (path 1 and path 2). As can be seen in FIG. 3B, the first path clearly shows blocked connectivity between two different networking elements. As discussed above, in some examples, the graphical representation of the network 112 may be annotated to show information about the network and/or the networking elements. For example, some/all of the network configuration settings for the networking elements may be shown within the graph display area 355.

Figure 4:
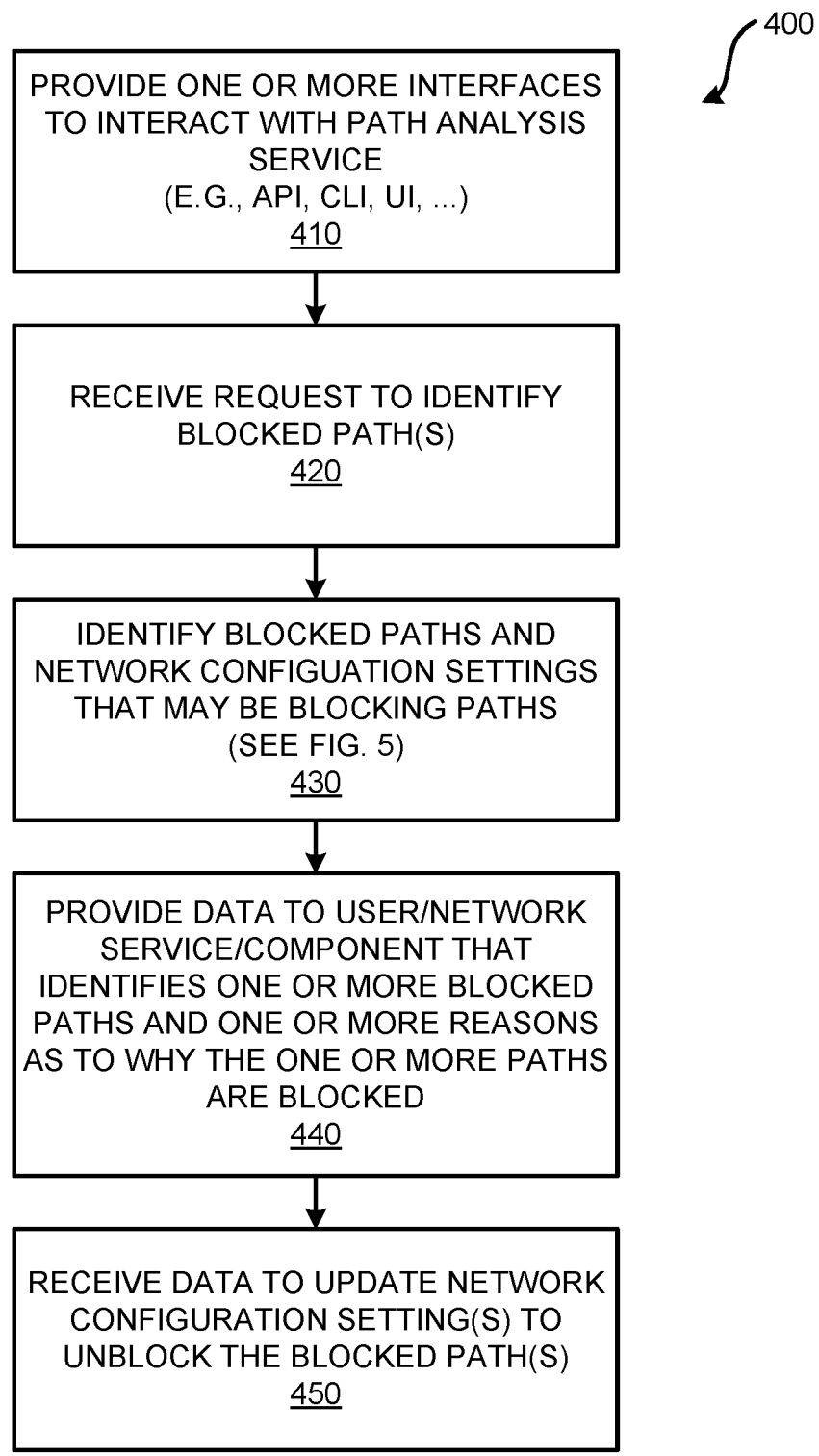
FIG. 4 is a flow diagram showing an illustrative routine for identifying blocked network paths and providing an explanation of the blocked network paths within a network.
Figure 5:
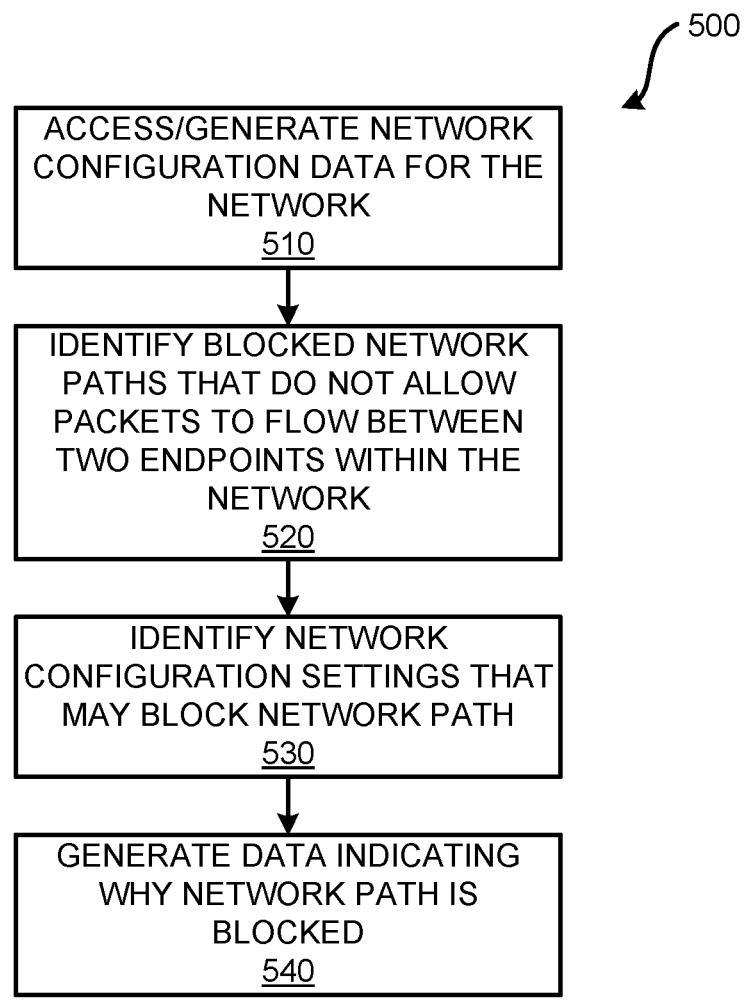
FIG. 5 is a flow diagram showing an illustrative routine for identifying blocked paths, identifying network configuration settings that are blocking the network paths, and generating data indicating why the network paths are blocked.
Figure 6:
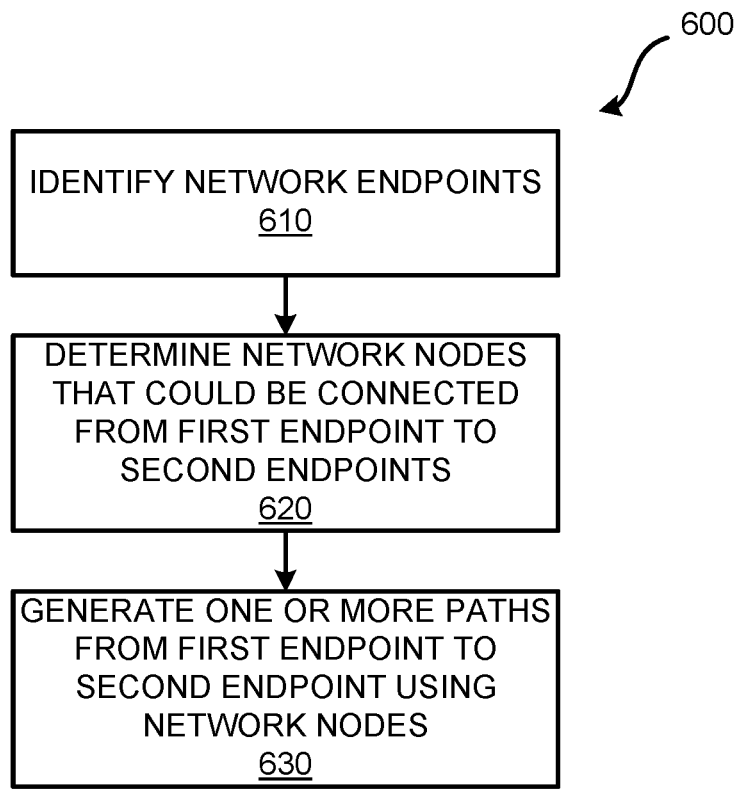
FIG. 6 is a flow diagram showing an illustrative routine for identifying network endpoints, generating one or more paths between the network endpoints.

FIGS. 4-6 are flow diagrams showing illustrative routines 400, 500, and 600 for identifying blocked network paths, providing an explanation of the blocked network paths, and configuring networking elements within a network, according to examples disclosed herein. It should be appreciated that the logical operations described herein with respect to FIG. 4, FIG. 5, FIG. 6, and the other FIGS., can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein. Some or all of these operations can also be performed by components other than those specifically identified.

FIG. 4 is a flow diagram showing an illustrative routine 400 for identifying blocked network paths and providing an explanation of the blocked network paths within a virtual network, according to some examples. The routine 400 may be performed by computing resources 120 associated with the BPAS 102 and/or other computing resources, such as computing resources associated with some other network or system.

At 410, one or more interfaces are provided for analyzing a network. As discussed above, the BPAS 102 may expose one or more API(s) 140, a CLI, and/or a UI 136, such as a graphical user interface. A user, such as user 138, may utilize the interfaces to configure, view, and manage the networks.

At 420, a request is received to identify blocked network path(s) within one or more networks. For example, the request may be to analyze a virtual network that includes one or more VPCs and may span across different regions. As discussed above, the request may be received from a user, such as user 138 of a service provider network 116. In some examples, the path analysis service 122 within BPAS 102 receives the request.

At 430, blocked paths and network configuration settings that may be blocking the paths are identified. As discussed above, the BPAS 102 may receive the request, and access network configuration data that may be used by the path analysis service 118 to identify one or more blocked paths within a virtual network. The service 118 may also use the network configuration data to identify network configuration settings that may be blocking a packet flow between a first endpoint and a second endpoint. More details are provided below with regard to FIG. 5.

At 440, data is provided to a user and/or some other device or component that identifies one or more blocked paths and one or more reasons as to why the one or more paths are blocked. As discussed above, the BPAS 102 may provide data to the user 138 via a UI 136, such as a GUI.

At 450, data is received to update one or more network configuration setting(s) to unblock one or more nodes within the blocked paths and one or more reasons as to why the one or more paths are blocked. As discussed above, the BPAS 102 may receive data from the user 138 via a UI 136, such as a GUI, to specify one or more network configuration settings.

FIG. 5 is a flow diagram showing an illustrative routine 500 for identifying blocked paths, identifying network configuration settings that are blocking the network paths, and generating data indicating why the network paths are blocked. The routine 500 may be performed by computing resources 120 associated with the BPAS 102 and/or other computing resources associated with a network.

At 510, network information data is accessed/generated for the network. As discussed above, the user 138 may utilize an API 140, a CLI, or a UI 136 to request to analyze a network. In some configurations, the BPAS 102 receives the request and requests the network information from a network analysis service that performs an analysis of the client's virtual network. The network information may, for example, identify instances that are included within the virtual network, include descriptions of the instances (e.g., roles assigned to computation instances, permissions granted to or denied to resource instances, IP addresses assigned to the instances, etc.), describe relationships among the instances (e.g., paths over the network between instances), and describe interfaces or access points to external entities (e.g., computation instances that can be accessed by entities external to the virtual network). In some cases, static network reachability analysis can be performed by a path analysis service (PAS) before tasks are run across the network. For instance, in some examples, the PAS may use formal methods, or some other verification technique, to determine blocked paths within a network to be deployed within the service provider network.

At 520, blocked network path(s) are identified. As discussed above, the PAS 118 may use the network information to identify the PAS 118 displays a complete network path between the source and destination and provides network settings along the path that may be blocking the path. For instance, the PAS 118 may show that a firewall setting is blocking the path at one point in the blocked path, and that a router setting is blocking the path at another point in the blocked path.

At 530, network configuration settings that may be causing a network element to be blocking the packet flow from the first endpoint to the second endpoint are determined. For instance, the PAS 118 may examine each network configuration setting for each of the network elements that are included in a path between the first endpoint and the second endpoint to determine if one or more of the network configuration settings are blocking the packet flow.

At 540, data is generated that indicates why a network path is a blocked network path. As discussed above, the PAS 118 may identify at 530, that one or more network configuration settings are blocking the packet flow at one or more of the network elements in the virtual network.

FIG. 6 is a flow diagram showing an illustrative routine 600 for identifying network endpoints, generating one or more paths between the network endpoints. The routine 600 may be performed by computing resources 120 associated with the BPAS 102 and/or other computing resources associated with the network.

At 610, network endpoints are identified. As discussed above, the BPAS 102, the PAS 118, or some other device/component may identify a first network endpoint and a second network endpoint that are used to determine possible paths. As discussed above, the network 112 may include many possible paths between the first network endpoint and the second network endpoint that travel through many different network nodes. In some examples, the user 138 may specify the first network endpoint and the second network endpoint.

At 620, network nodes that could be connected from the first endpoint to the second endpoint are determined. As discussed above, the network analysis service 122 may perform a static analysis of a network 112 using formal methods, or some other verification technique, to generate network information that includes information about network elements that are within a particular path.

At 640, one or more paths that flow from the first endpoint to the second endpoint that include the network nodes are generated. As discussed above, the PAS 118 and/or then network analysis service 122 may identify the paths. In some examples, the PAS 118 may limit the number of paths to identify. For example, the PAS 118 may limit the number of paths to two, three, or some other number.

Figure 7:
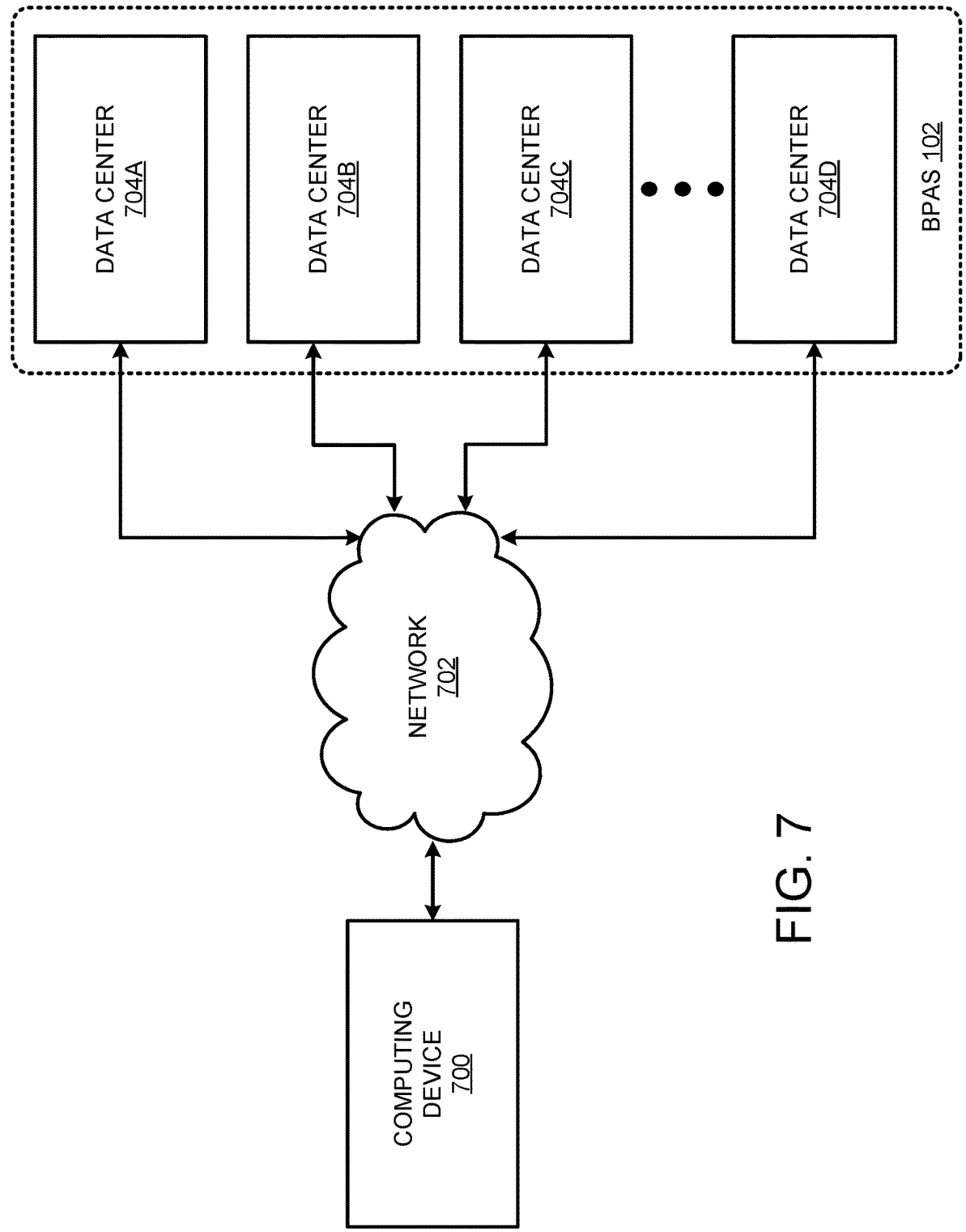
FIG. 7 is a system and network diagram that shows an illustrative operating environment including several data centers that can be configured to implement aspects of the functionality described herein.

FIG. 7 is a system and network diagram that shows one illustrative operating environment for the configurations disclosed herein that includes an BPAS 102 that can be configured to provide the functionality described above. As discussed above, the BPAS 102 can execute network services that provide computing resources for implementing the functionality disclosed herein. The computing resources implemented by the BPAS 102 can be data processing resources, such as virtual machine ("VM") instances, data storage resources, networking resources, data communication resources, network services, and other types of resources.

The computing resources utilized can be general-purpose or can be available in a number of specific configurations. For example, data processing resources can be available as physical computers or VM instances in a number of different configurations. The VM instances can be configured to execute applications, including web servers, servers, media servers, database servers, some or all of the network services described above, and/or other types of programs. Data storage resources can include file storage devices, block storage devices, and the like. The BPAS 102 can also include and utilize other types of computing resources not mentioned specifically herein.

As also discussed above, the computing resources provided by the BPAS 102 are enabled in one implementation by one or more data centers 704A-704D (which might be referred to herein singularly as "a data center 704" or collectively as "the data centers 704"). The data centers 704 are facilities utilized to house and operate computer systems and associated components. The data centers 704 typically include redundant and backup power, communications, cooling, and security systems. The data centers 704 can also be located in geographically disparate locations. One illustrative configuration for a data center 704 that can be utilized to implement the technologies disclosed herein will be described below with regard to FIG. 8.

The users can access the services provided by the BPAS 102 over a network 702, which can be a wide area communication network ("WAN"), such as the Internet, an intranet or an Internet service provider ("ISP") network or a combination of such networks. For example, and without limitation, a computing device 700 operated by a user or other user of the BPAS 102, such as the computing device 134, can be utilized to access the BPAS 102 by way of the network 702. It should be appreciated that a local-area network ("LAN"), the Internet, or any other networking topology known in the art that connects the data centers 704 to remote users and other users can be utilized. It should also be appreciated that combinations of such networks can also be utilized.

Figure 8:
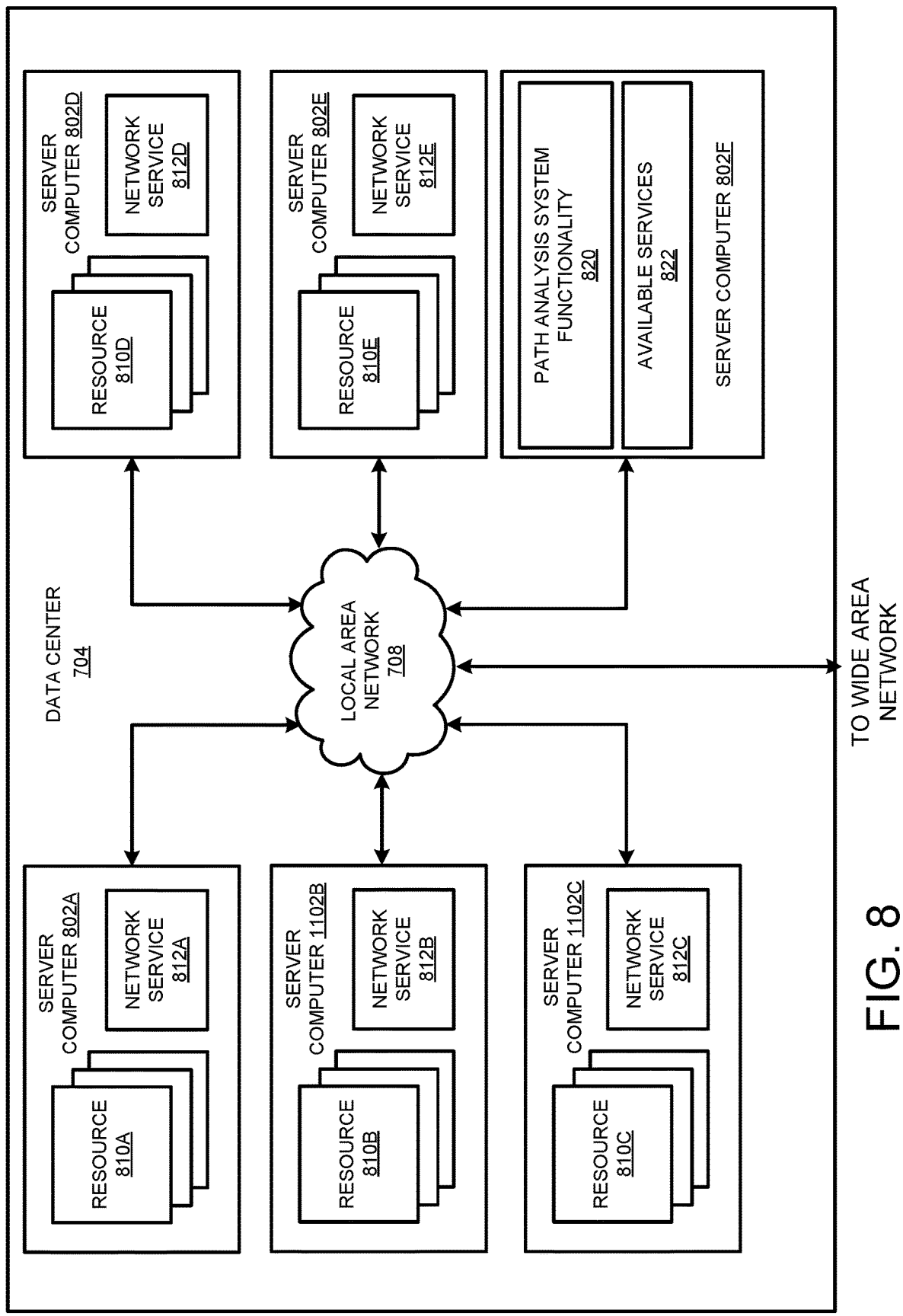
FIG. 8 is a computing system diagram illustrating a configuration for a data center that can be utilized to implement aspects of the technologies disclosed herein.

FIG. 8 is a computing system diagram that illustrates examples for a data center 704 that can be utilized to configure and manage a global network, and the other functionality disclosed herein. The example data center 704 shown in FIG. 8 includes several server computers 802A-802F (which might be referred to herein singularly as "a server computer 802" or in the plural as "the server computers 802").

The server computers 802 can be standard tower, rack-mount, or blade server computers configured appropriately for providing various types of computing resources 810 for implementing the functionality disclosed herein. As mentioned above, the computing resources 810 provided by the data center 704 can be data processing resources such as VM instances or hardware computing systems, data storage resources, database resources, networking resources, and others. Some of the servers 802 can also be configured to execute network services 812A-812E, respectively, capable of instantiating, providing and/or managing the computing resources 810A-810E.

The data center 704 shown in FIG. 8 also includes a server computer 802F that can execute some or all of the software components described above. For example, and without limitation, the server computer 802F can be configured to execute functionality described herein, such as path analysis system functionality 820 and other available services 822. The server computer 802F can also be configured to execute other components and/or to store data for providing some or all of the functionality described herein. In this regard, it should be appreciated that components or different instances of the services can execute on many other physical or virtual servers in the data centers 704 in various configurations.

In the example data center 704 shown in FIG. 8, an appropriate LAN 808 is also utilized to interconnect the server computers 802A-802F. The LAN 808 is also connected to the network 702 illustrated in FIG. 7. It should be appreciated that the configuration of the network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 704A-704D, between each of the server computers 802A-802F in each data center 704, and, potentially, between computing resources 810 in each of the data centers 704. It should be appreciated that the configuration of the data center 704 described with reference to FIG. 8 is merely illustrative and that other implementations can be utilized.

Figure 9:
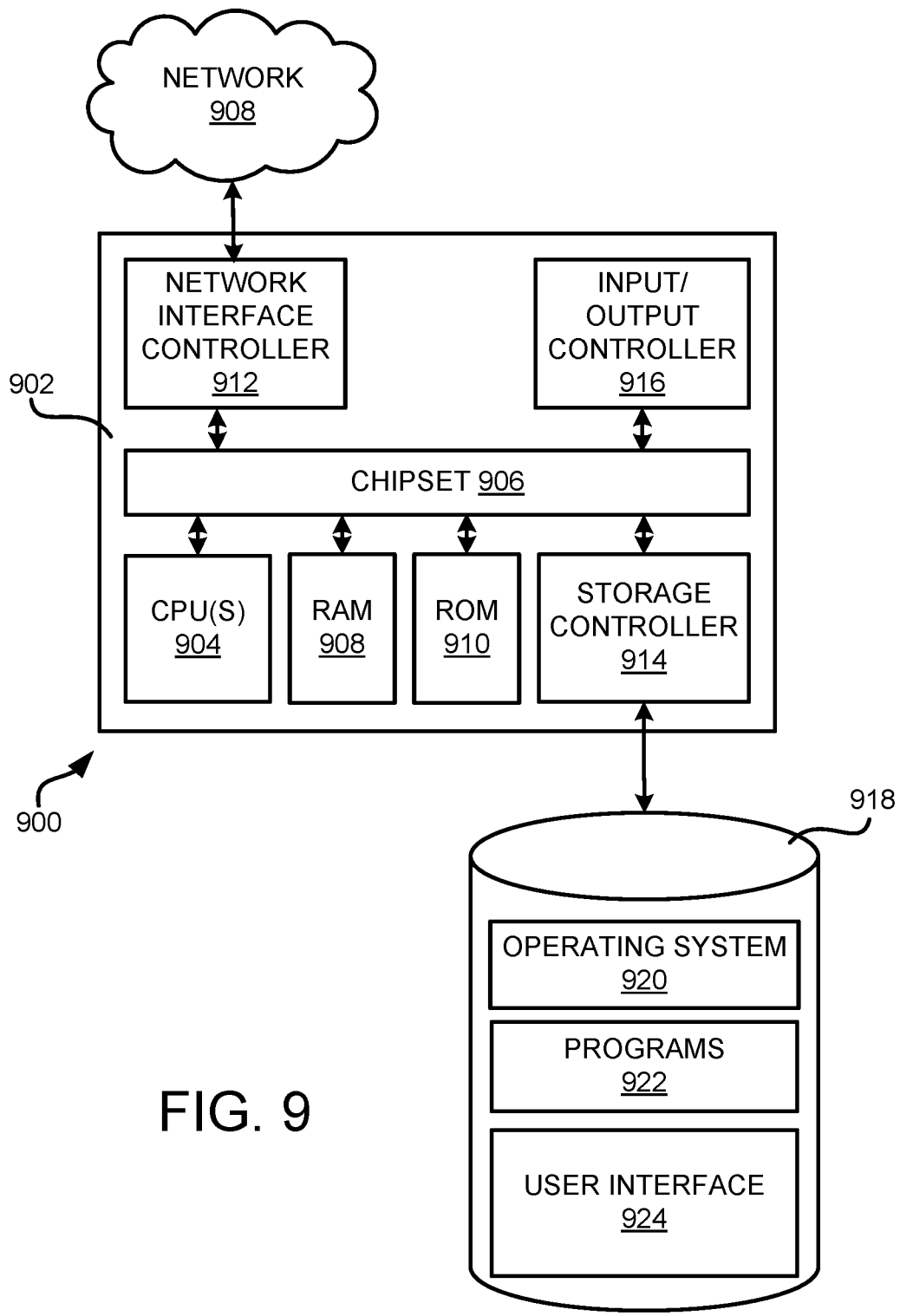
FIG. 9 is a computer architecture diagram showing an illustrative computer hardware architecture for implementing a computing device that can be utilized to implement aspects of the various technologies presented herein.

FIG. 9 shows an example computer architecture for a computer 900 capable of executing program components for implementing the functionality described above. The computer architecture shown in FIG. 9 illustrates a conventional server computer, workstation, desktop computer, laptop, tablet, network appliance, e-reader, smartphone, or other computing device, and can be utilized to execute any of the software components presented herein.

The computer 900 includes a baseboard 902, or "motherboard," which is a printed circuit board to which a multitude of components or devices can be connected by way of a system bus or other electrical communication paths. In one illustrative configuration, one or more central processing units ("CPUs") 904 operate in conjunction with a chipset 906. The CPUs 904 can be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 can provide an interface to a RAM 908, used as the main memory in the computer 900. The chipset 906 can further provide an interface to a computer-readable storage medium such as a read-only memory ("ROM") 910 or non-volatile RAM ("NVRAM") for storing basic process that help to startup the computer 900 and to transfer information between the various components and devices. The ROM 910 or NVRAM can also store other software components necessary for the operation of the computer 900 in accordance with the configurations described herein.

The computer 900 can operate in a networked environment using logical connections to remote computing devices and computer systems through a network, such as the network 908. The chipset 906 can include functionality for providing network connectivity through a NIC 912, such as a gigabit Ethernet adapter. The NIC 912 is capable of connecting the computer 900 to other computing devices over the network 908. It should be appreciated that multiple NICs 912 can be present in the computer 900, connecting the computer to other types of networks and remote computer systems.

The computer 900 can be connected to a mass storage device 918 that provides non-volatile storage for the computer. The mass storage device 918 can store an operating system 920, programs 922, user interface 924, and data, which have been described in greater detail herein. The mass storage device 918 can be connected to the computer 900 through a storage controller 914 connected to the chipset 906. The mass storage device 918 can consist of one or more physical storage units. The storage controller 914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 can store data on the mass storage device 918 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 918 is characterized as primary or secondary storage, and the like.

For example, the computer 900 can store information to the mass storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 can further read information from the mass storage device 918 by detecting the physical states or characteristics of one or more particular locations within the physical storage units.

In addition to the mass storage device 918 described above, the computer 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 900.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 918 can store an operating system 920 utilized to control the operation of the computer 900. According to examples, the operating system comprises the LINUX operating system or one of its variants. According to another configuration, the operating system comprises the WINDOWS® SERVER operating system from MICROSOFT Corporation. According to further configurations, the operating system can comprise the UNIX operating system or one of its variants. It should be appreciated that other operating systems can also be utilized. The mass storage device 918 can store other system or application programs and data utilized by the computer 900.

In examples, the mass storage device 918 or other computer-readable storage media is encoded with computer-executable instructions which, when loaded into the computer 900, transform the computer from a general-purpose computing system into a special-purpose computer capable of implementing the configurations described herein. These computer-executable instructions transform the computer 900 by specifying how the CPUs 904 transition between states, as described above. According to examples, the computer 900 has access to computer-readable storage media storing computer-executable instructions which, when executed by the computer 900, perform the various processes described above with regard to FIGS. 1-9. The computer 900 can also include computer-readable storage media for performing any of the other computer-implemented operations described herein.

The computer 900 can also include one or more input/output controllers 916 for receiving and processing input from a number of input devices, such as a keyboard, a mouse, a touchpad, a touch screen, an electronic stylus, or other type of input device. Similarly, an input/output controller 916 can provide output to a display, such as a computer monitor, a flat-panel display, a digital projector, a printer, or other type of output device. It will be appreciated that the computer 900 might not include all of the components shown in FIG. 9, can include other components that are not explicitly shown in FIG. 9, or can utilize an architecture completely different than that shown in FIG. 9.

Based on the foregoing, it should be appreciated that technologies for identifying blocked paths and identifying network configuration settings that may block the network paths have been disclosed herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A system comprising:
   one or more processors; and
   one or more computer-readable media storing computer-executable instructions that, when executed by the one or more processors, cause the one or more processors to:

receive, from a computing device of a customer of a service provider network, a request to analyze a virtual private cloud (VPC) hosted by the service provider network to identify blocked network paths between a first endpoint and a second endpoint;

access network data generated by a network analysis service of the service provider network that identifies network elements within the VPC, and network paths among the network elements between the first endpoint and the second endpoint;

identify a blocked network path of the network paths based at least in part on an analysis of the network data and network configuration settings associated with at least a portion of the network elements, wherein the blocked network path includes one or more first network elements that block a packet flow between the first endpoint and the second endpoint and one or more second network elements that allow the packet flow between the first endpoint and the second endpoint;

identify one or more of the network configuration settings for the one or more first network elements that block the packet flow between the first endpoint and the second endpoint;

generate blocked path explanation data that indicates one or more reasons as to why the blocked network path is blocked, wherein the one or more reasons include the one or more of the network configuration settings for the one or more first network elements that block the packet flow; and provide, for display on the computing device of the customer, the blocked path explanation data and path data indicating the one or more first network elements and the one or more second network elements.

2. The system of claim 1, wherein the network data includes IP addresses assigned to the network elements, and permissions associated with the network elements, wherein the permissions include one or more rules that specify what packets are blocked, what packets are unblocked, and where packets are to be routed.

3. The system of claim 1, wherein providing the blocked path explanation data comprises providing for display, to the computing device of the customer, a graphical user interface (GUI) that includes a network display area that depicts a graphical representation of the blocked network path of the VPC that indicates the one or more first network elements that are blocking the packet flow, and user interface (UI) elements that, upon selection, cause a network configuration setting for at least one of the one or more of the network configuration settings to be displayed via the GUI.

4. The system of claim 1, wherein the instructions further cause the one or more processors to receive from the computing device of the customer, data that changes the one or more of the network configuration settings to unblock the blocked network path.

5. A computer-implemented method comprising:
receiving, from a computing device of a user of a service provider network, a request to analyze a network hosted by the service provider network;

accessing network data that identifies network elements within the network, and one or more network paths among the network elements between a first endpoint and a second endpoint;

identifying one or more blocked network paths from the one or more network paths based, at least in part, on a programmatic analysis of the network data and network configuration settings associated with at least a portion of the network elements, wherein the one or more blocked network paths include one or more first network elements that block a packet flow between the first endpoint and the second endpoint and one or more second network elements that allow the packet flow between the first endpoint and the second endpoint;

identifying one or more of the network configuration settings for the one or more first network elements that block the packet flow between the first endpoint and the second endpoint;

generating data that indicates one or more reasons as to why the one or more blocked network paths are blocked; and causing at least a portion of the data to be available for use by the user.

6. The computer-implemented method of claim 5, wherein generating the data comprises including the one or more of the network configuration settings for the one or more first network elements that block the packet flow between the first endpoint and the second endpoint.

7. The computer-implemented method of claim 5, wherein accessing the network data generated comprises causing a network analysis service of the service provider network to generate the network data for one or more virtual private clouds (VPCs) associated with the user, wherein the network analysis service uses a static network analysis to identify network connectivity between different network elements of the network.

8. The computer-implemented method of claim 5, further comprising receiving second data that changes at least one of the one or more of the network configuration settings that unblock the packet flow between the first endpoint and the second endpoint.

9. The computer-implemented method of claim 5, wherein causing the at least the portion of the data to be available comprises:
generating a graphical user interface (GUI) that includes a display area for indicating the one or more reasons and user interface (UI) elements that, upon selection, are configured for configuring one or more of the network configuration settings for the one or more network elements of the network; and
providing the GUI to the computing device of the user.

10. The computer-implemented method of claim 9, further comprising:
generating a graphical representation of the one or more blocked network paths of the networks; and
wherein the GUI includes the graphical representation.

11. The computer-implemented method of claim 5, wherein the network data comprises one or more of data identifying instances of the network elements that are implemented in the network, first descriptions of the network elements in the network, second descriptions of relationships among the network elements in the network, or third descriptions of interfaces to entities external to the network.

12. The computer-implemented method of claim 5, further comprising providing an application programming interface (API) that exposes functionality for analyzing the network, identifying the one or more blocked network paths, and receiving data to adjust the one or more of the network configuration settings.

13. A system comprising:
one or more processors associated with a service provider network; and one or more computer-readable media storing computer-executable instructions that, when executed by the one or more processors, cause the one or more processors to:

receive, from a computing device of a user, a request to analyze a network hosted at least in part by a service provider network;

access network data that identifies network elements within the network, and one or more network paths among the network elements between a first endpoint and a second endpoint;

identify one or more blocked network paths from the one or more network paths based, at least in part, on a programmatic analysis of the network data and network configuration settings associated with at least a portion of the network elements, wherein the one or more blocked network paths include one or more first network elements that block a packet flow between the first endpoint and the second endpoint and one or more second network elements that allow the packet flow between the first endpoint and the second endpoint;

identify one or more of the network configuration settings for the one or more first network elements that block the packet flow between the first endpoint and the second endpoint;

generate data that indicates one or more reasons as to why the one or more blocked network paths are blocked; and cause at least a portion of the data to be made available to the user.

14. The system of claim 13, wherein the instructions further cause the one or more processors to include the one or more network configuration settings for the one or more first network elements that block the packet flow between the first endpoint and the second endpoint.

15. The system of claim 13, wherein accessing the network data comprises causing a network analysis service to generate the network data for one or more virtual private clouds (VPCs) associated with the user, wherein the network analysis service uses a static network analysis to identify network connectivity between different network elements of the network.

16. The system of claim 13, wherein the instructions further cause the one or more processors to receive data that changes at least one of the one or more network configuration settings that unblock the packet flow between the first endpoint and the second endpoint.

17. The system of claim 13, wherein causing the at least the portion of the data to be made available comprises:

generating a graphical user interface (GUI) that includes a display area for indicating the one or more reasons and user interface (UI) elements that, upon selection, are configured for configuring one or more of the network configuration settings for the one or more network elements of the network; and providing the GUI to the computing device of the user.

18. The system of claim 17, wherein the instructions further cause the one or more processors to:

generate a graphical representation of the one or more blocked network paths of the network; and wherein the GUI includes the graphical representation.

19. The system of claim 13, wherein the network data comprises one or more of data identifying instances of the network elements that are implemented in the network, first descriptions of the network elements in the network, second descriptions of relationships among the network elements in the network, or third descriptions of interfaces to entities external to the network.

20. The system of claim 13, wherein the instructions further cause the one or more processors to provide an application programming interface (API) that exposes functionality for analyzing the network, identifying the one or more blocked network paths, and receiving data to adjust the one or more of the network configuration settings.

* * * * *